July 2, 1946.　　　　　O. C. TRAVER　　　　　2,403,414
PROTECTIVE SYSTEM
Filed Jan. 27, 1944
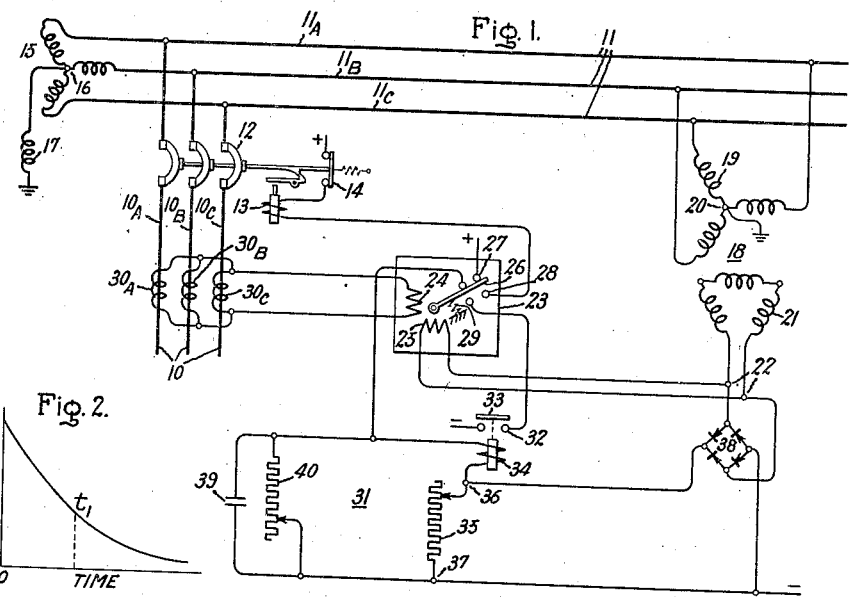
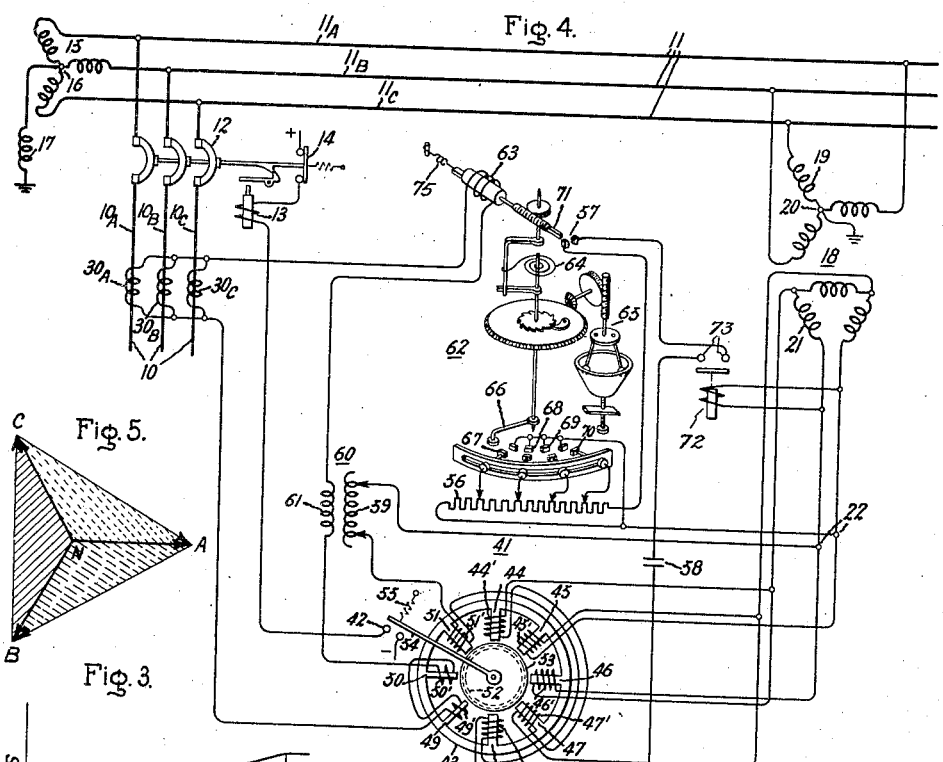
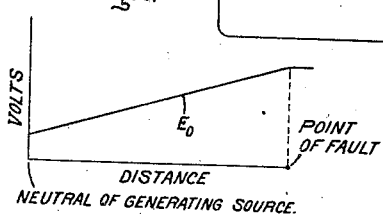
Inventor:
Oliver C. Traver,
by Harry E. Dunham
His Attorney.

Patented July 2, 1946

2,403,414

UNITED STATES PATENT OFFICE 2,403,414

PROTECTIVE SYSTEM

Oliver C. Traver, Drexel Hill, Pa., assignor to General Electric Company, a corporation of New York Application January 27, 1944, Serial No. 519,928

31 Claims. (Cl. 175—294)

My invention relates to protective systems for electric circuits and more particularly to protective systems employing a relay of the distance type for protecting against ground faults.

There has existed for a long time the demand for ground fault distance relays which will give substantially the same distance response on all faults involving but a single conductor. In order to get satisfactory operation a single ground distance relay has been provided with switching means responsive to the occurrence of a ground fault on the system for affording the proper energization of the distance relay. Usually distance relays are energized in response to both a current and a voltage quantity so as to give an impedance or so-called distance response, and the satisfactory prior art devices having only a single relay required both a switching of the current and potential quantities for the same distance response on all the ground faults involving but a single conductor which might occur on the polyphase circuit being protected. Such an arrangement is disclosed and claimed in a copending application of Albert R. Van C. Warrington, Serial No. 423,661, filed December 19, 1941, and assigned to the same assignee as the present application.

It is an object of my invention to provide a new and improved ground fault distance relay which is simple and compact, and which operates satisfactorily on ground faults.

Still another object of my invention is to provide a new and improved protective system in which overvoltage alone is used to cause operation of an electroresponsive device in a time proportional to the distance from the electroresponsive device to the fault.

A further object of my invention is to provide a ground fault distance relay which operates in response to the first power of a voltage quantity of the circuit.

Another object of my invention is to provide a new and improved ground fault distance relay in which operation thereof is obtained in response to the zero sequence voltage of the circuit modified by the area of a voltage triangle of said circuit.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a schematic diagram of a protective system embodying my invention, Figs. 2 and 3 are curve diagrams to aid one in understanding my invention, Fig. 4 is a schematic diagram of a protective system embodying a modification of my invention, and Fig. 5 is a vector diagram to aid one in understanding my invention.

Referring now to Fig. 1 of the drawing, I have illustrated a ground fault protective system of the distance type for a polyphase circuit 10 in which overvoltage alone is used to control an electroresponsive device which operates in a time proportional to the distance of the electroresponsive device from the ground fault. The electroresponsive device is assumed to be at the point in the circuit where the voltage quantity used for energization purposes is obtained. Protected polyphase circuit 10 is illustrated as a three-phase circuit comprising phase conductors 10A, 10B, and 10C, respectively, and connected to an associated electric circuit 11 by means of a suitable circuit interrupting means 12. Associated circuit 11 is illustrated as comprising phase conductors 11A, 11B, and 11C respectively. Circuit interrupting means 12 has been specifically illustrated as a latched closed circuit breaker having a trip coil 13 and an "a" switch 14, which is closed when the circuit breaker is closed and open when the circuit breaker is open. The system comprising circuits 10 and 11 should be grounded through any suitable grounding means which is illustrated in Fig. 1 as a Y connected generator 15 having the neutral 16 thereof grounded through an impedance 17.

On electric systems upon which a ground fault exists there is, of course, also present a zero sequence voltage. It is a well known fact that with a uniform impedance per unit of distance this zero sequence voltage is a maximum at the fault and decreases in a substantially linear manner from the fault to the generating source. Within the source, distance loses its meaning.

My invention is particularly concerned with an arrangement in which an overvoltage or, in other words, an increase in the zero sequence voltage above a predetermined value, as for example in protected circuit 10, is used to indicate the distance to the ground fault and consequently to cause operation of circuit interrupting means 12 on a single line to ground fault, that is, a ground fault involving only a single conductor in a time proportional to the distance of the fault from circuit interrupting means 12 which is assumed to be substantially at the same place as the electroresponsive device controlling the same, to be described hereinafter.

In order to obtain a zero phase sequence quantity proportional to the voltage existing on circuit 10 adjacent the electroresponsive device, I provide a transformer 18 including a Y connected primary winding 19 having a grounded neutral 20 and a broken delta secondary winding 21 including a pair of terminals 22. Primary winding 19 may be suitably connected to the end of circuit 10 adjacent circuit interrupting means 12 or as illustrated, to circuit 11 adjacent to circuit 10, the voltage of which would be substantially the same.

In order to be sure that the ground fault distance electroresponsive device to be described hereinafter operates only for faults occurring on protected circuit 10, I provide a directional relay 23 including a pair of windings 24 and 25 respectively. Directional relay 23 includes a contact controlling element 26 which is adapted to control normally closed contacts 27 and normally open contacts 28. A suitable spring 29 is provided to bias contact controlling member 26 into engagement with contacts 27. Winding 25 of relay 23 is connected across terminals 22 of broken delta secondary winding 21 of potential transformer 18 so as to be energized in response to the zero phase sequence voltage existing on the adjacent end of protected circuit 10.

Winding 24 on the other hand, in order to give electroresponsive device 23 a directional characteristic, is energized in response to the zero sequence current flowing in protected circuit 10. To this end each of the phase conductors 10A, 10B, and 10C are provided with a current transformer designated respectively as 30A, 30B, and 30C. The secondary windings of each of these transformers 30A, 30B, and 30C are connected in parallel with each other and to winding 24 of directional relay or starting unit 23 so that winding 24 is energized with a zero sequence current quantity. As long as no ground fault exists on protected circuit 10, no zero sequence current will flow in winding 24 to cause contact controlling member 26 to move away from contacts 27. Whenever a line to ground fault occurs on the system other than on circuit 10, any zero sequence current flowing in winding 24 will, in cooperation with the zero sequence voltage existing in winding 25, cause a torque on contact controlling member 26 to aid spring 29 in holding contact controlling member 26 against contact 27. Only when a ground fault occurs on circuit 10 will the zero sequence current in winding 24 cause the power directional relay, or starting unit 23, to be energized so as to open contacts 27 and close contacts 28.

The electroresponsive device of my invention which is adapted to respond solely in dependence upon an overvoltage, and specifically in dependence upon the increase in zero sequence voltage, upon the occurrence, of a ground fault in a time proportional to the distance of the fault (as measured by impedance) from the electroresponsive device is generally indicated at 31. This electroresponsive device includes a pair of contacts 32 which are connected in series with the contacts 28 and in series with the trip coil 13 across a suitable source of direct current potential. A circuit controlling member 33 which is illustrated as being controlled in response to the energization of a winding 34 is adapted to control the contacts 32 and consequently the energization of the trip coil 13. It should be understood that circuit controlling member 33 which is schematically illustrated may be an electronic device or may be operated by means of a suitable electronic relay if desired. If circuit controlling member 33 is controlled by a mechanical relay, it would preferably be of the polarized type so as to be very sensitive and so as to prevent any possibility of holding up on a reverse current in winding 34. Electroresponsive device 31 also includes a variable resistor 35 having terminals 36 and 37 which are connected across terminals 22 of broken delta secondary winding 21 of potential transformer 18 through a suitable full wave rectifier generally indicated at 38. Winding 34, the energization of which controls circuit or contact controlling member 33, is connected across a source of direct current potential in series with variable resistor 35 and the normally closed contacts 27 of directional relay or starting unit 23. Consequently, as long as contact controlling member 26 of directional relay 23 bridges contacts 27, winding 34 is energized and contacts 32 are open as indicated in Fig. 1. The variable resistor 35 is adjustable to determine the portion of the zero sequence potential which is to appear across terminals 36 and 37, the purpose of which will become apparent from the following description.

Electroresponsive device 31 further includes a capacitor 39 connected across the source of direct current potential in parallel with serially connected resistor 35 and winding 34. In addition, I also provide an adjustable discharge resistor 40 connected across capacitor 39. Capacitor 39, as will become apparent from the following description, provides the timing means by which electroresponsive device 31 is caused to operate in a time dependent upon the distance of the electroresponsive device from the fault.

Under normal conditions, as indicated in Fig. 1, the capacitor 39 is charged to the potential of the direct current source since it is connected across this source of direct current potential as indicated through the contacts 27 of directional relay 23. In the event of a ground fault occurring on protected circuit 10 zero sequence quantities will exist to cause the operation of directional relay 23 to open contacts 27. Immediately thereafter, capacitor 39 will begin to discharge through resistor 40 and the potential across this capacitor and resistor tends to maintain the current flowing through winding 34 and consequently tends to maintain contacts 32 in the open condition. The voltage across capacitor 39 with respect to time starting with zero time at the instant contacts 27 are opened is represented by the curve of Fig. 2. It will be observed that from zero-time to time equals $t_1$ that the capacitor discharge curve is substantially linear. It will be understood that if circuit controlling member 33 is controlled by electronic means substantially all the discharge current will flow through resistor 40, which may be adjusted to produce the desired shape of the curve of Fig. 2. However, under certain conditions the resistor 40 may be dispensed with and the discharge of capacitor 39 controlled by resistor 35 at a somewhat reduced degree of accuracy.

The rectified zero phase sequence voltage appearing across terminals 36 and 37 of resistor 35 is in opposition to the potential across resistor 40. That is, the difference in these two potentials appears across relay winding 34. From Fig. 3 which assumes a uniform impedance per unit of distance, it will be obvious that for points between the electroresponsive devices and the fault, the nearer the ground fault is to electroresponsive device 31 the higher the zero phase sequence voltage across resistor 35 will be. If the fault is on protected circuit 10 so that directional relay 23 opens its contacts 27, capacitor 39 will begin to discharge in accordance with the curve of Fig. 2. When the voltage across resistor 40 substantially equals the opposing zero sequence voltage across resistor 35, winding 34 is deenergized so as to permit contact controlling member 33 to close contacts 32 and cause the operation of circuit interrupting means 12. Since the first part of the drop in voltage of capacitor 39 is substantially linear as is illustrated in Fig. 2 and the zero sequence voltage across resistor 35 is linear with respect to distance from the fault as indicated in Fig. 3, the operating or null point in the potential across relay winding 34 will be reached and contacts 32 will be closed when a single line to ground fault occurs on protected circuit 10 in a time proportional to the distance of the fault from electroresponsive device 31. On account of the internal impedance of rectifier 38, the drop across resistor 35 will vary with its ohmic value. For this and other reasons, resistor 35 will be adjusted so that for faults occurring on circuit 10 immediately adjacent electroresponsive device 31, operation of electroresponsive device 31 will occur without any delay. In other words, the rectified zero phase sequence voltage across resistor 35 for these conditions should be equal to the initial charge on capacitor 39.

It will be observed that electroresponsive device 31 operates substantially in response to the first power of the zero sequence voltage since contacts 32 are closed when the zero sequence voltage across resistor 35 approximately equals the voltage across resistor 40. In other words, operation of electroresponsive device 31 occurs at a null point which is dependent solely on substantially the first power of the zero phase sequence voltage of the protected circuit.

It should be understood that other distance relays farther out on protected circuit 10 may operate to isolate the fault prior to the operation of electroresponsive device 31, in which case the zero phase sequence voltage will return to normal and the directional relay 23 will return to its original position so that the apparatus will be restored to the condition illustrated in Fig. 1 whereby tripping of circuit interrupting means 12 will not occur. It will be understood that additional means will be provided if necessary to protect circuit 10 against faults involving more than one phase conductor. Since the zero phase sequence voltage at terminals 22 of potential transformer 18 is usually lower on a ground fault involving more than one conductor, operation on double line to ground faults though in correct sequence would be materially delayed and additional protective apparatus should be provided for any such faults.

It will be observed that with the arrangement described above a distance relay is provided which operates in a time proportional to the distance between the relay and the fault and which is dependent solely upon an overvoltage to give a response in a time proportional to the distance from the fault, and preferably dependent solely upon the first power of the magnitude of the zero phase sequence voltage.

In view of the detailed description included above, the operation of the protective system of Fig. 1 will be obvious to those skilled in the art and no further discussion will be included.

As has been suggested above, substantial changes in the system setup will affect the operation of electroresponsive device 31. I have discovered, however, that for many systems, particularly those which are preponderantly inductive such as those in which the system neutral is solidly grounded or where the current is limited by inductive reactance, that at the point of fault the ratio of the area defined by the three line to line voltages of the three phase system divided by the zero phase sequence voltage (hereafter expressed as $E_A/E_0$) is approximately equal to a constant regardless of the system setup or the changes made thereon. The above ratio is, for practical purposes, constant regardless of the location of the fault and whether it is near the generating source or remote therefrom. At any other point on the circuit between the fault and the source, the residual voltage which is three times the zero phase sequence voltage decreases with the line drop between the point in question and the point of the fault as was pointed out above.

In Fig. 4 I have disclosed a protective system in which I have provided a ground fault distance relay whose principle of operation is based upon the ratio of $E_A/E_0$ at the fault being equal to a constant for a predominantly inductive system grounded solidly or through reactance. The corresponding parts of Fig. 4 have been designated by the same reference numerals as in Fig. 1.

Referring now to Fig. 4 I have illustrated an electroresponsive device 41 having inherent directional characteristics as will be described hereinafter which is adapted to control contacts 42 connected in series with trip coil 13 of circuit breaker 12. Electroresponsive device 41, which operates in response to the first power of the zero phase sequence voltage and is restrained from operation in response to the area of the voltage triangle referred to above and represented by the expression $E_A$, is similar in construction to the electroresponsive device disclosed and claimed in United States Reissue Patent 21,813, Verrall, granted May 27, 1941, and assigned to the same assignee as the present application. As illustrated in Fig. 4 this electroresponsive device 41 includes a hollow magnetic stator 43 having a plurality of inwardly projecting salients 44 to 51 inclusive. The salients 49 and 50 have a relatively small cross section for a purpose which will become apparent as the following description proceeds. Each of these salients is provided with a winding designated by the corresponding reference numeral marked with a prime. Stator 43 also includes a central magnetic member 52 concentrically positioned with respect to the ends of the salients 44 to 51 inclusive so as to form an air gap between the ends of the salients and the central magnetic member 52. A suitable cup-shaped rotor 53 is adapted to rotate in this area and is connected to a contact controlling element 54 for bridging contacts 42 connected in the trip circuit of circuit breaker 12. A relatively weak spring 55 may be provided to bias contact controlling member 54 away from contacts 42.

The windows 48′, 49′, 50′ and 51′ energize the corresponding salients so as to produce fluxes which interact to produce an operating torque tending to close contacts 42. As has been pointed out above, it is desired for this operating torque to be substantially proportional to the first power of the zero phase sequence voltage $E_0$. To this end the windings 49' and 50' which are polarizing windings similar to the winding 24 of directional relay 23 are energized with the zero phase sequence current flowing as the output of the parallel connected secondary windings of current transformers 30A, 30B, and 30c respectively. The windings 48' and 51', on the other hand, are energized with the zero phase sequence voltage appearing across the terminals 22 of potential transformer 18 through a variable resistance 56, normally open contacts 57 of a starting unit, normally open contacts 73, capacitor 58, and the adjustable winding 59 of a combined transformer and reactor 60 well known in the art as a transactor, all of which will be described in greater detail hereinafter. The interaction of the fluxes produced by the windings 48' to 51' inclusive produce a torque proportional to the zero phase sequence voltage and since salients 49 and 50 are considerably restricted in size, saturation occurs so that a substantially constant flux is produced thereby causing the operating torque to be substantially proportional to the first power of the zero phase sequence voltage over that range with which we are concerned. The capacitor 58 is provided to neutralize the inductance of the series connected windings so that variation of the resistance 56 will produce a linear change insofar as the energization of windings 48' and 51' is concerned. Ordinarily the reactance of adjustable winding 59 is small in comparison with the reactance of the rest of this series circuit so that changes in its adjustment will not materially change the total. If, however, in any case this is not true, the capacitor 58 can be made variable and any needed correction can be made. Other means of securing a first power voltage torque would include its rectification and use in a D'Arsonval element having a permanent magnet field.

In order to obtain a restraining torque substantially proportional to the area of the triangle formed by the line to line voltages of the protected circuit still utilizing potential transformer 18, the windings 44' to 47' have been energized with particular line to ground potentials. From Fig. 5 it will be obvious that the line to line potentials of protected circuit 10 form the triangle ABC, the area of which is $E_A$. The voltage between phase conductors 10A and 10B is represented by the vector $E_{AB}$. Similarly, the voltage between phase conductors 10B and 10c is represented by the vector $E_{BC}$ and the voltage between phase conductors 10c and 10A is represented by the vector $E_{CA}$. The normal line to ground voltages of Fig. 5 are represented by vectors $E_{AN}$, $E_{BN}$ and $E_{CN}$ respectively. Since potential transformer 18 does not permit one to readily obtain line to line voltage quantities therefrom, but does permit one to readily obtain line to ground quantities therefrom, it will be obvious from Fig. 5 that the area $E_A$ of the voltage triangle ABC may readily be obtained by a summation of the areas of the three triangles of Fig. 5 designated as ABN, BCN, and CAN. It should be observed that although transformer 18 is illustrated as being connected to circuit 11, it is connected to circuit 11 closely adjacent to circuit 10 so that for all practical purposes, the voltages obtained from potential transformer 18 are the voltages existing on the near end of protected circuit 10. Accordingly, I have illustrated the windings 44', 45', 46' and 47' energized respectively with the voltages $E_{AN}$, $E_{BN}$, $E_{CN}$ and $E_{AN}$ respectively. With this arrangement, the windings 44' and 45' tend to produce a torque proportional to the area of the triangle ABN of Fig. 5, while the energization of windings 45' and 46' tends to produce a torque proportional to the area BCN in Fig. 5, and the energization of windings 46' and 47' tends to produce a torque proportional to the area CAN of Fig. 5. Since these torques are all in the same direction with respect to contact controlling element 54 and rotor 53, a total restraining torque proportional to the sum of the areas of these three triangles, or in other words, proportional to the area of triangle ABC of Fig. 5 represented as $E_A$ is obtained. It will be observed that the torque produced by virtue of the energization of windings 44' and 51' is neutralized by the equal and opposite torque produced by the energization of windings 47' and 48'.

Since, as was pointed out above, the ratio of the area of the voltage triangle $E_A$ to the zero phase sequence voltage $E_O$ is substantially constant at the fault regardless of any system changes which might occur, this ratio can be reflected back to the relay by compensating for the line drop due to the residual current, thereby reflecting this constant ratio back to the relay, when the fault is at a limiting position such as near the far end of the line. Although not illustrated in Fig. 4, it should be understood that any suitable line drop compensation for the several phase currents may also be used to secure compensation for $E_A$. I have discovered, however, that for some systems, by using an increased amount of compensation for the $E_O$ quantity and no compensation for the $E_A$ quantity, approximately the same results are obtained as if both quantities were compensated for the line drop between the relay and the fault. In Fig. 4 therefore, I have merely compensated for the line drop insofar as it effects the zero phase sequence voltage, and this is accomplished by means of the transactor 60 having a primary winding 61 connected so as to be energized with the output of the current transformers 30A, 30B, and 30c respectively which have their secondary windings connected in parallel. The output of the secondary winding 59 which is a compensation voltage proportional to the zero phase sequence line drop when transactor 60 is properly adjusted, is superimposed on the zero phase sequence voltage obtained across the terminals 22 of potential transformer 18. Since protected circuit 10 is assumed to be predominantly inductive in character, it is only necessary to compensate for the inductive drop and consequently adjustable winding 59 is adjusted to introduce a voltage component proportional to the zero phase sequence voltage drop between the relay and the maximum distance at which a fault may occur on the line and for which tripping of circuit breaker 12 is response to operation of electroresponsive device 41 is desired. It should be understood that winding 59 will be adjusted to add three or more times the line drop of the residual voltage if compensation for the area of the voltage triangle is not to be used.

In order to obtain a time proportional to distance quantity, or response, in the same manner as in Fig. 1, I have provided a timing unit generally indicated at 62, which comprises a motor element 63 connected in series with the polarizing windings 49' and 50' of electroresponsive device 41. Whenever a ground fault occurs, therefore, the zero sequence current flowing in winding of the motor element 63, will cause the motor element to operate and wind up spring 64. The energy stored in spring 64 will be dissipated through a timing element 65 so as to cause a circuit controlling element 66 to move with uniform speed to successively engage contacts 67, 68, 69, and 70, thereby varying the resistance 56 and consequently changing the reach of distance electroresponsive device 41. As the resistance 56 is progressively cut out of the circuit, a given residual voltage across terminals 22 of transformer 18 will cause a progressively increasing operating torque to be applied to rotor 53 so that operation in a time dependent upon the distance between the fault and the relay will be obtained.

Motor element 63, when deenergized, is reset by spring 75 and, when energized, also moves a contact controlling element 71 so as to engage contacts 57 and thereby act as a starting unit in some respects similar to directional relay 23 of Fig. 1. No single conductor to ground fault can effect operation of electroresponsive device 41 until a zero phase sequence current exists in protected circuit 10 to energize motor element 63 and close contacts 57. Contacts 57 are not essential. They are useful though to conserve the energy to be taken from the potential transformer 18 which, being connected to the bus, can thereby be the source of supply to a large number of ohm units 41 protecting the same number of circuits such as 10. Since only those units having the requisite amount of residual current in coil 63 will close their contacts 57 to use the potential from terminals 22, the potential transformers 18 need be only large enough to supply just the limited number that can be so connected at any one time.

A ground fault involving more than one conductor can cause operation of electroresponsive device 41 since under such fault conditions the restraining torque proportional to $E_A$ decreases to zero at the fault. Accordingly for a fault involving two conductors to ground and with line drop compensation in each phase conductor, we will have zero restraint on windings 44' to 47' of relay 41, if the fault is at that limiting position on protected circuit 10 for which the line drop compensation has been set. Furthermore, for any other such fault between that limiting position and the relay, there will be an excess in compensation which, in the case of a two conductor to ground fault, will result in the reversal of the effective phase rotation of the three phase voltage connected to windings 44' to 47', and $E_A$ will, therefore, become an operating torque instead of a restraint and will properly cause the closure of contacts 42 of relay 41 without any assistance from windings 48' and 51'. In this respect the protected system of Fig. 4 differs from the protective system of Fig. 1. Consequently, if a fault to ground involving more than one phase conductor of protected circuit 10 can occur, means such as relay contacts 73 may be provided to modify or prevent operation of electroresponsive device 41 on such ground faults involving more than one conductor. Various means for distinguishing between a single line to ground and a double line to ground fault are known. One such arrangement which might advantageously be used in connection with Fig. 4 is disclosed and claimed in copending application Serial No. 453,661—Neher, filed August 5, 1942, and assigned to the same assignee as the present application. Another means for distinguishing between a double line to ground and a single line to ground fault, for example, is disclosed in Hanna Patent 2,272,991. In Fig. 4 I have illustrated a simple voltage relay 72 which is energized across the open terminals of broken delta winding 21 of transformer 18 and whose contacts 73 control the energization of windnigs 48' and 51' of electroresponsive device 41. On a system having a sufficient amount of reactance in current limiting reactor 17, this relay 72 would be picked up on a single line to ground but not on a double line to ground fault.

The operation of the protective system of Fig. 4 will be obvious to those skilled in the art in view of the detailed description included above. It will be observed that I have provided a ground fault distance relay which operates in a time dependent upon the distance of the electroresponsive device from the fault, which practically is not affected by system changes when applied to a predominantly reactive system and which is sturdy in construction and also is simple and economical both to manufacture and to install.

While I have shown and described several embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. Controlling means for an electric circuit comprising an electroresponsive device, and means for energizing said electroresponsive device from said circuit so as to be dependent solely on overvoltage to effect a circuit controlling action upon the occurrence of a ground fault on said circuit in a time proportional to the distance of said device from said fault.

2. Ground fault controlling means for an electric circuit having a grounded neutral, comprising an electroresponsive device, and means for energizing said electroresponsive device from said circuit so as to be responsive to the ratio of the area defined by the triangle formed by the line-to-line voltage vectors of said circuit to the first power of the zero phase sequence voltage existing on said circuit upon the occurrence of a ground fault thereon so as to effect a controlling action in a time proportional to the distance of said device from said ground fault.

3. Controlling means for an electric circuit comprising a distance responsive device energized from said circuit including a movable contact controlling member, and means for effecting a circuit controlling action of said contact controlling member dependent solely upon the zero phase sequence voltage existing on said circuit with the occurrence of a ground fault thereon in a time proportional to the distance of said device from said fault.

4. Controlling means for an electric circuit comprising an electroresponsive device, a source of control potential, means for normally energizing said device from said source, a capacitor, means for charging said capacitor from said source, means for disconnecting said source from said device and from said capacitor upon the occurrence of an abnormal condition on said circuit, and means for maintaining said electroresponsive device energized from said charge on said capacitor for a variable time after the occurrence of said abnormal condition.

5. Controlling means for an electric circuit comprising an electroresponsive device, a source of control potential, means for normally energizing said device from said source, a capacitor, means for charging said capacitor from said source, means for disconnecting said source from said device and from said capacitor upon the occurrence of a ground fault on said circuit, and means for maintaining said electroresponsive device energized from said charge on said capacitor for a time dependent upon the distance of said fault from said device.

6. A protective arrangement for an alternating current electric circuit comprising an electroresponsive device, a capacitor, a source of control potential, means for normally energizing said device and said capacitor from said source, means for obtaining a rectified zero sequence quantity from said circuit for energizing said device upon the occurrence of a ground on said circuit, means for disconnecting said source from said device and from said capacitor upon the occurrence of said ground fault, and means for maintaining said electroresponsive device energized from said charge on said capacitor for a time dependent upon the magnitude of said rectified quantity.

7. A protective arrangement for a polyphase alternating current electric circuit subject to ground faults thereon, comprising an electroresponsive device, a source of control potential, means for normally energizing said device from said source, a capacitor, means for charging said capacitor from said source, means responsive to the direction of power flow in said circuit for disconnecting said source from said device and from said capacitor upon the occurrence of said ground fault, and means for maintaining said electroresponsive device energized from said charge on said capacitor for a time dependent upon the distance of said fault from said device.

8. A protective arrangement for an electric circuit, comprising a normally charged capacitor, means for obtaining from said circuit a voltage proportional to the zero sequence voltage of said circuit, means responsive to a ground on said circuit for causing said capacitor to discharge at a predetermined rate, and means responsive to a predetermined relation between said obtained voltage and the voltage across said capacitor.

9. A protective arrangement for an electric circuit, comprising a normally charged capacitor, means for obtaining from said circuit a voltage proportional to the zero sequence voltage of said circuit, means responsive to a ground on said circuit for causing said capacitor to discharge at a predetermined rate, and means responsive to the voltage across said capacitor decreasing to a predetermined value relative to said obtained voltage.

10. A ground fault protective arrangement for a three-phase electric circuit, comprising an electroresponsive device including windings, means for energizing said windings from said circuit so as to operate in response to a quantity proportional to the zero sequence voltage of said circuit modified by a quantity proportional to the area defined by the triangle formed by the line-to-line voltage vectors of said circuit, and means for compensating for the line drop in said circuit between said electroresponsive device and a fault at a predetermined position on said circuit.

11. A ground fault protective arrangement for a three-phase electric circuit, comprising an electroresponsive device including windings, means for energizing said windings from said circuit so as to produce an operating torque on said device proportioned to the zero sequence voltage of said circuit and a restraining torque proportioned to the area defined by the triangle formed by the line-to-line voltage vectors of said circuit, and means for compensating for the line drop produced by the flow of a predetermined current in said circuit between said device and a fault at a predetermined position on said circuit.

12. A ground fault protective arrangement for a three-phase electric circuit, comprising a distance relay including windings, means for energizing said windings from said circuit so as to operate in response to the difference between a torque proportional to the zero sequence voltage of said circuit and a torque proportional to the area defined by the triangle formed by the line-to-line voltage vectors of said circuit, and means for compensating for the zero phase sequence current flowing in said circuit between said device and a limiting fault position on said circuit so as to indicate the approximate voltage at the fault for a fault at said limiting position.

13. A ground fault protective arrangement for a three-phase electric circuit, comprising an electroresponsive device including windings, and means for energizing said windings from said circuit so as to produce an operating torque on said device proportioned to the first power of the zero sequence voltage of said circuit and a restraining torque proportioned to the area defined by the triangle formed by the line-to-line voltage vectors of said circuit.

14. A ground fault protective arrangement for an electric circuit having a grounded neutral, comprising an electroresponsive device, means for energizing said electroresponsive device from said circuit so as to be responsive to the ratio of the area defined by the triangle formed by the line-to-line voltage vectors of said circuit to the first power of the zero phase sequence voltage existing on said circuit upon the occurrence of a ground fault thereon, and means for compensating for the line drop in said circuit at least in so far as said zero phase sequence voltage is concerned.

15. A ground fault protective arrangement for an electric circuit having a grounded neutral, comprising an electroresponsive device, means for energizing said electroresponsive device from said circuit so as to be responsive to the ratio of the area defined by the triangle formed by the line-to-line voltage vectors of said circuit to the first power of the zero phase sequence voltage existing on said circuit upon the occurrence of a ground fault thereon, and means for compensating for the line drop in said circuit due to the current flowing in said circuit.

16. A ground fault protective arrangement for a polyphase circuit, comprising an electroresponsive device having a movable member, means connected to said circuit for exerting on said member an operating torque proportional to the residual current in said circuit, and means connected to said circuit for exerting on said member a restraining torque proportional to the area defined by the triangle formed by the line-to-line voltage vectors of said circuit.

17. A ground fault protective arrangement for a polyphase circuit, comprising an electroresponsive device having a movable member, means connected to said circuit for exerting on said member an operating torque proportional to a function of the product of the residual current and the residual voltage of said circuit, and means connected to said circuit for exerting on the area defined by the triangle formed by the said member a restraining torque proportional to line-to-line voltage vectors of said circuit.

18. A ground fault protective arrangement for a polyphase circuit, comprising an electroresponsive device having a movable member, means connected to said circuit for exerting on said member an operating torque proportional to the residual voltage of said circuit, means connected to said circuit for exerting on said member a restraining torque proportional to the area defined by the triangle formed by the line-to-line voltage vectors of said circuit, and means connected to said circuit for controlling the operation of one of said torque exerting means in accordance with the number of conductors involved in a fault on said circuit.

19. A ground fault protective arrangement for a polyphase circuit, comprising an electroresponsive device having a movable member, means connected to said circuit for exerting on said member an operating torque proportional to the residual voltage of said circuit, means connected to said circuit for exerting on said member a restraining torque proportional to the area defined by the triangle formed by the line-to-line voltage vectors of said circuit, and means connected to said circuit for controlling the operation of said first mentioned torque exerting means in accordance with the number of conductors involved in a fault on said circuit.

20. A ground fault protective arrangement for a polyphase circuit, comprising an electroresponsive device having a movable member, means connected to said circuit for exerting on said member an operating torque proportional to the residual voltage of said circuit, means connected to said circuit for exerting on said member a restraining torque proportional to the area defined by the triangle formed by the line-to-line voltage vectors of said circuit, and timing means responsive to a ground fault on said circuit for varying the response of one of said torque exerting means.

21. A ground fault protective arrangement for a polyphase circuit, comprising an electroresponsive device having a movable member, means connected to said circuit for exerting on said member an operating torque proportional to the residual voltage of said circuit, means connected to said circuit for exerting on said member a restraining torque proportional to the area defined by the triangle formed by the line-to-line voltage vectors of said circuit, and timing means responsive to a ground fault on said circuit for varying the response of said operating torque exerting means.

22. A ground fault protective arrangement for a polyphase circuit, comprising an electroresponsive device having a movable member, means for exerting on said member an operating torque, means connected to said circuit for exerting on said member a restraining torque proportional to the area defined by the triangle formed by the line-to-line voltage vectors of said circuit, and means responsive to a ground fault on said circuit for connecting said operating torque exerting means to said circuit so that it is energized by the residual voltage of said circuit.

23. A ground fault protective arrangement for a polyphase circuit, comprising an electroresponsive device having a movable member, means for exerting on said member an operating torque, means connected to said circuit for exerting on said member, a restraining torque proportional to the area defined by the triangle formed by the line-to-line voltage vectors of said circuit, and means responsive to the residual current in said circuit for connecting said operating torque exerting means to said circuit so that it exerts a torque proportional to the residual voltage of said circuit.

24. A ground fault protective arrangement for a polyphase circuit, comprising an electroresponsive device having a movable member, means for exerting on said member an operating torque, means connected to said circuit for exerting on said member a restraining torque proportional to the area defined by the triangle formed by the line-to-line voltage vectors of said circuit, and means responsive to a predetermined electric condition of said circuit indicative of a ground fault involving less than a predetermined number of line conductors of said circuit for connecting said operating torque exerting means to said circuit so that it exerts a torque proportional to the residual voltage of said circuit.

25. In a ground fault protective arrangement for a polyphase circuit, a single distance relay directly operable in response to a fault to ground on any conductor of said polyphase circuit, and means connected to said circuit for modifying the operation of said single distance relay in accordance with the number of conductors involved in a fault on said circuit.

26. In a protective system for an electric circuit subject to the occurrence of fault conditions thereon, switching means for interrupting said circuit, and means dependent upon the magnitude of the residual potential of said circuit for distinguishing between double line to ground and single line to ground faults on said circuit for controlling the operation of said switching means.

27. A ground fault relay for an electric circuit comprising an operating winding, means connected to said circuit for energizing said winding in response to the first power of the zero phase sequence voltage at a predetermined point on said circuit, and means responsive to a ground fault on said circuit for varying the energization of said winding to effect the operation of said relay in a time dependent upon the distance between the fault and said predetermined point.

28. A ground fault relay for an electric circuit comprising a movable circuit controlling element having a normal position and a circuit controlling position, and means for moving said element immediately to said circuit controlling position in response to a ground fault within a predetermined distance of a predetermined point on the circuit including means adapted when connected to said circuit at said point for exerting on said element a restraining torque which is proportional to the area defined by the triangle formed by the line-to-line voltage vectors of said circuit and which is in a direction to oppose movement of said element from said normal position to said circuit controlling position, and means adapted when connected to said circuit at said point for exerting on said element in a direction to effect movement thereof to said circuit controlling position a torque which is proportional to the zero phase sequence voltage at said point and which exceeds said restraining torque when the zero phase sequence voltage at said point exceeds a predetermined value below the value existing at said point when a ground fault occurs at said point.

29. A directional ground fault relay for an electric circuit comprising a movable circuit controlling member, two electromagnets cooperatively arranged to exert on said member a torque proportional to a function of the product of the fluxes of said electromagnets, means for exerting on said member a torque in a direction to restrain said member from moving in a circuit controlling direction, means for energizing one of said electromagnets from said circuit with a current which is proportional to a zero phase sequence voltage of said circuit, and means for energizing the other of said electromagnets from said circuit with a current which is proportional to the residual current in said circuit, said other of said electromagnets being saturated by its energizing current when the residual current in said circuit exceeds a predetermined value.

30. A directional ground fault relay for an electric circuit comprising a movable circuit controlling member, two electromagnets cooperatively arranged to exert on said member a torque proportional to a function of the product of the fluxes of said electromagnets, means connected to said circuit for exerting on said member in a direction to restrain said member from moving in a circuit controlling direction a torque proportional to the area defined by the triangle formed by the line-to-line voltage vectors of said circuit, means for energizing one of said electromagnets from said circuit with a current which is proportional to a zero phase sequence voltage of said circuit, and means for energizing the other of said electromagnets from said circuit with a current which is proportional to the residual current in said circuit, said other of said electromagnets being saturated by its energizing current when the residual current in said circuit exceeds a predetermined value.

31. A directional ground fault relay for an electric circuit comprising a movable circuit controlling member, two electromagnets cooperatively arranged to exert on said member a torque proportional to a function of the product of the fluxes of said electromagnets, means for exerting on said member a torque in a direction to restrain said member from moving in a circuit controlling direction, means for energizing one of said electromagnets from said circuit with a current which is proportional to a zero phase sequence voltage of said circuit, means for energizing the other of said electromagnets from said circuit with a current which is proportional to the residual current in said circuit, said other of said electromagnets being saturated by its energizing current when the residual current in said circuit exceeds a predetermined value, and timing means responsive to a ground fault on said circuit for varying the energization of one of said electromagnets a predetermined time after the ground fault occurs.

OLIVER C. TRAVER.